United States Patent [19]

Rubenstein

[11] Patent Number: 4,583,788

[45] Date of Patent: Apr. 22, 1986

[54] TRACTOR-TRAILER BRAKE SYSTEM

[75] Inventor: Raymond D. Rubenstein, LaGrange Park, Ill.

[73] Assignee: J. I. Case Company, Racine, Wis.

[21] Appl. No.: 580,417

[22] Filed: Feb. 15, 1984

[51] Int. Cl.⁴ .............................................. B60T 11/24
[52] U.S. Cl. ......................................... 303/7; 180/6.2; 303/6 A; 303/53
[58] Field of Search .................. 180/6.2; 280/67.1, 88, 280/428; 303/6 A, 7, 14, 53

[56] References Cited

U.S. PATENT DOCUMENTS 3,863,991 2/1975 Wilson ................................ 303/6 A Primary Examiner—Duane A. Reger
Attorney, Agent, or Firm—Cullen, Sloman, Cantor, Grauer, Scott & Rutherford

[57] ABSTRACT

A fluid power circuit providing a selective operation of a trailer brake system, coupleable with a tractor brake system, comprises a pilot operated valve located between tractor and trailer brake system. The pilot operated valve can be put in a fluid flow passing mode from its fluid blocking mode by simultaneous engagement of two tractor brakes. An independent engagement of either of the tractor brakes, which is necessary for sharp turns in the field operation, does not actuate the trailer brake system.

8 Claims, 1 Drawing Figure

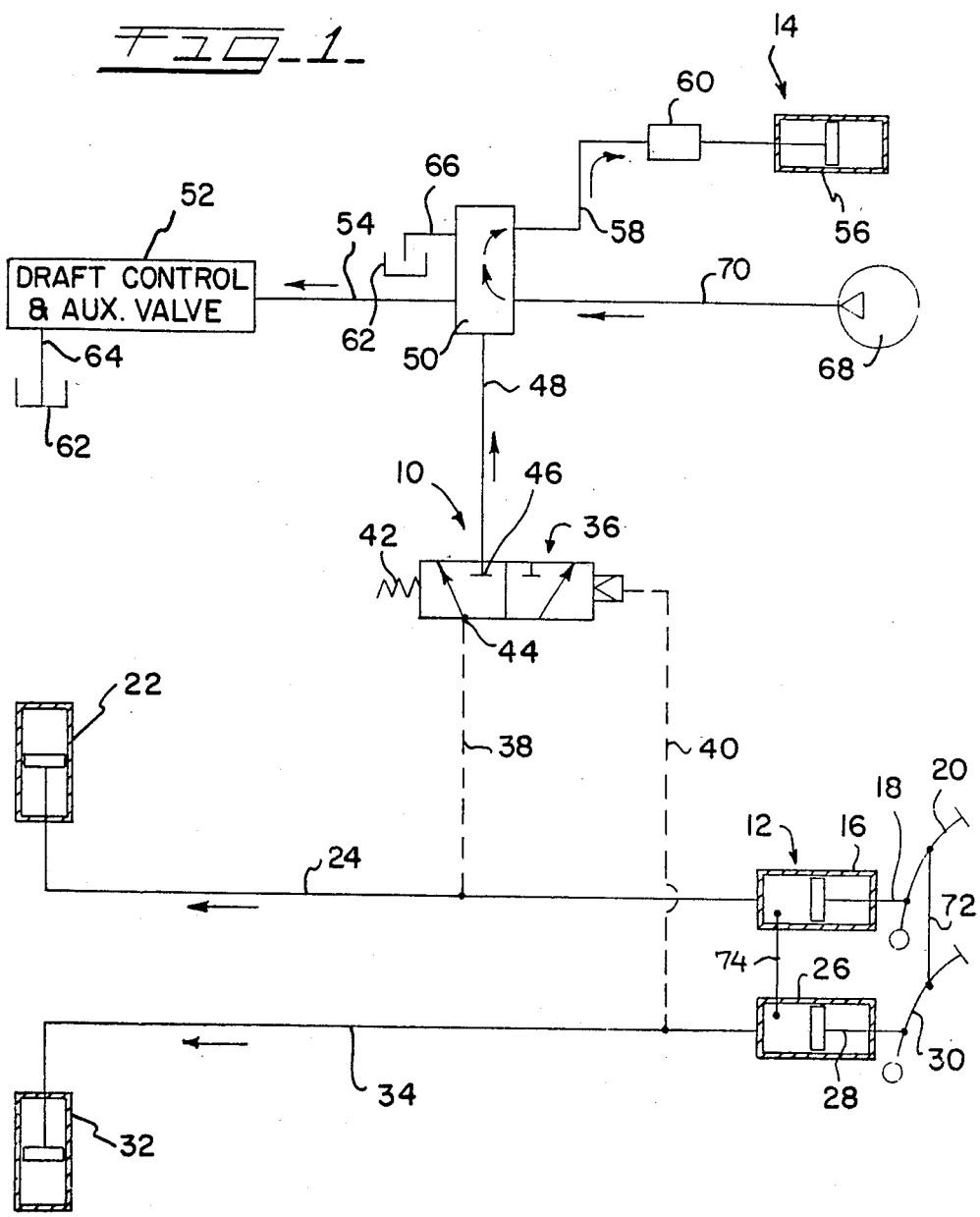

TRACTOR-TRAILER BRAKE SYSTEM

BACKGROUND OF THE INVENTION

This invention pertains to tractor-trailer brake systems and more particularly to a fluid power circuit providing a selective operation of the trailer brake system.

A trailer brake system is usually coupled with a tractor hydraulic system. Consequently, the actuation of the tractor brake simultaneously causes the braking of the trailer. Such an arrangement causes a problem during the field operations for an agricultural vehicle, such as a tractor or the like, connected with a wagon or other implement as a trailer unit. A trailer brake is added to an auxiliary hydraulic system of a tractor in the line from a pump to a draft control auxiliary valve. This valve is actuated by pressure in one of the main brake lines. Such pressure increases the pressure of the auxiliary pump output flow going to the brakes on a trailing wagon. When two brake pedals of a tractor are locked together for a road transportation, the tractor-trailer unitary system works well. But in the field, use of independent brake pedals on a tractor in order to make a sharper turn actuates the trailer brakes. Thus, the tractor's ability to turn is retarded.

The subject invention permits a selective field operation of a tractor-trailer brake system by hydraulically coupling the trailer brake system with the tractor brake system only when two independent tractor brakes are synchronously engaged.

SUMMARY OF THE INVENTION

According to the present invention, a fluid power circuit for a selective engagement of a trailer brake system coupleable with a tractor brake system, comprises independent first and second tractor brakes for braking separate sets of tractor wheels. The trailer brake system is actuated by valve means only in response to simultaneous engagement of both first and second tractor brakes.

BRIEF DESCRIPTION OF THE DRAWINGS

FIG. 1 is a diagram of the fluid power circuit providing selective operation of the trailer brake.

DESCRIPTION OF THE PREFERRED EMBODIMENT

The invention may be carried into practice in a number of ways but one specific embodiment will be described by way of example only.

Referring now to the drawing wherein the reference characters designate like or corresponding parts throughout the view, there is shown in FIG. 1 a fluid power circuit 10 comprising a tractor brake system 12 and a trailer brake system 14. The tractor brake system 12 comprises a right-hand brake including a master cylinder 16. A piston rod 18 of the cylinder 16 is actuated by a pedal 20 located in a tractor cab. The cylinder 16 is connected with the right-hand wheel brake cylinder 22 via the right-hand brake line 24.

Analogously to the right-hand brake system, the left-hand brake comprises the brake master cylinder 26, the piston rod 28 thereof being actuated by a brake pedal 30. The cylinder 26 is connected with a left-hand brake 32 via a brake line 34.

A pilot-operated valve 36 is connected with the right-hand brake line 24 through a pilot line 38 and with the left-hand brake line 34 via a pilot line 40. The control valve 36 is urged to stay in a fluid non-passing or blocking mode by a spring 42, as shown in the diagram in FIG. 1. The outlet end 44 of the right-hand pilot line 38 is disconnected from the inlet 46 of the trailer brake actuation line 48 in the valve blocking mode. The trailer brake actuation line 48 is connected to the trailer brake valve 50. The valve 50 guides the fluid flow to the draft control and auxiliary valve 52 via the line 54 and the wagon brake 56 via the line 58 and coupler 60. The auxiliary valve 52 controls the fluid flow to various hydraulically operated parts of a tractor. The coupler 60 connects the tractor hydraulic system with the same of a trailing implement. The valves 50 and 52 facilitate the fluid discharge into a reservoir 62 through the lines 64 and 66 respectively. The auxiliary pump 68 supplies the fluid flow to the auxiliary valve 52 and to the trailer brake 56 through the line 70 and valve 50.

The brake pedals 20 and 30 can be coupled by a link 72 if necessary by a vehicle operator. The brake master cylinders 16 and 26 have an interconnecting pressure equalization line 74 being in operation only when two brakes are simultaneously engaged.

In operation, when an operator depresses the right-hand brake pedal 20, the wheel brake 22 is engaged. However, the pressurized fluid in the line 38 cannot reach the trailer brake valve 50. This is because the valve 36 is positioned in a blocking mode, as shown in FIG. 1, terminating the flow at the end point 44. This allows a tractor to make the right turn using the right brake without actuation of a trailer brake.

The left-hand brake actuation, by depressing the pedal 30, pushes the fluid flow through the line 34 into the brake 32. The pressurized fluid in the pilot line 40 forces the valve 36 to move into its fluid passing mode against the force of the spring 42. But lack of a pressurized fluid flow in the pilot line 38, as the right-hand brake is not engaged, prevents the fluid flow through the valve 36 into the supply line 48. This allows an engagement of the left brake for assisting in a tractor left turn execution without actuation of a trailer brake.

Thus, an independent actuation of either the tractor right-hand brake or the left-hand brake cannot actuate the trailer brake system.

However, if both tractor brakes are simultaneously actuated, for instance by virtue of the link 72 coupling the pedals 20 and 30, the pressurized fluid in the pilot line 38 moves through the end point 44 and valve 36 into the supply line 48, since the valve 36 was shifted into the fluid passing mode by the pressurized fluid in the pilot line 40. The pressurized fluid in the line 48 shifts a spool in the valve 50 and thus diverts or reroutes the auxiliary pump output flow into the trailer brake 56 via the line 58. After the release of the brakes, the fluid backs up through the line 58 and the excess thereof dumps into the reservoir 62 via the line 66.

When the brake pedal is released and, consequently, pressure in the pilot lines 38, 40 is dropped, the spring 42 biases the pilot valve 36 to its original position shown in the diagram. In this position the valve 36 is in the fluid blocking mode, i.e., the pilot line 38 is cut off at the stop point 44.

The subject fluid power circuit enables a tractor operator to apply tractor brakes synchronously with the trailer brakes, if necessary. This mode of operation is very helpful during the road transportation. A quick uncoupling of tractor brakes for field operations facilitates the tractor-trailer turn execution by automatic de-activating of the trailer brakes.

While one embodiment of the invention has been illustrated and described herein, various changes and modifications may be made therein without departing from the spirit of the invention as described by the scope of the appended claims.

What is claimed is:

1. A fluid power circuit providing a selective engagement of a trailer brake system being coupleable with a tractor brake system and comprising:
   said tractor brake system having a first tractor brake for braking first wheel means on one side of a tractor, and
   second tractor brake system for braking second wheel means on another side of said tractor;
   said trailer brake system being actuated only in response to simultaneous engagement of said first and second tractor brakes;
   valve means for controlling a fluid flow to said trailer brake system.

2. The invention according to claim 1, and
   said valve means including a spring-loaded valve disposed between said tractor and trailer brake systems for re-routing a pressurized fluid flow from a hydraulic source to said trailer brake system.

3. The invention according to claim 1, and
   said valve means being pilot operated and connected with said first tractor brake via a first pilot line and with said second tractor brake via a second pilot line;
   said valve means blocking said fluid flow during an actuation of either said first or second brake.

4. The invention according to claim 3, and
   said first pilot line causing a valve shift upon actuation of said tractor first brake for connecting said second pilot line to said trailer brake system;
   said second pilot line being pressurized by actuation of said second brake.

5. The invention according to claim 1, and
   said first brake and said second brake interconnectable by link means for synchronous engagement thereof.

6. The invention according to claim 1, and
   spring means urging said valve to stay in its fluid flow blocking mode.

7. A fluid power circuit for selective engagement of a trailer brake system coupleable with a tractor brake system, comprising:
   first and second tractor brakes capable of independent braking of correspondent tractor wheels;
   a pilot operated valve connected to said first brake by a first pilot line and to said second brake by a second pilot line;
   said first pilot line being pressurized upon engagement of said first brake and said second pilot line being pressurized upon engagement of said second brake;
   said pilot operated valve controlling the fluid flow from a tractor hydraulic source into said trailer brake system upon synchronous engagement of said first and second brakes.

8. The invention according to claim 7,
   said valve being spring loaded;
   said first pilot line being generated by an application of said first brake and forcing said valve to shift into a flow passing mode;
   the pressurized fluid flow moving through said second pilot line and said valve in its flow passing mode for actuating a trailer bake valve;
   said trailer brake valve capable of re-routing a fluid flow from said hydraulic source into said trailer brake system.

* * * * *